United States Patent Office 3,249,633
Patented May 3, 1966

3,249,633
ACRYLIC ACID ESTER SYNTHESIS
Jesse T. Dunn and Alex E. Brodhag, Jr., Charleston, W. Va., assignors to Union Carbide Corporation, a corporation of New York
No Drawing. Filed July 23, 1958, Ser. No. 750,310
The portion of the term of the patent subsequent to Dec. 27, 1977, has been disclaimed and dedicated to the Public
2 Claims. (Cl. 260—486)

This invention relates to an improved process for the production of acrylic acid esters.

It is well known that acrylic acid and its esters can be produced by the interaction of acetylene and carbon monoxide with compounds having a replaceable hydrogen, such as water, alcohols, carboxylic acids, ammonia and amines, in the presence of a transition metal carbonyl, or other catalyst, for example, the complex triphenyl phosphine-nickel halide compounds, or the complex nickel halide-quaternary ammonium compounds. However, these catalysts will produce only moderate yields of the alkyl acrylates, and one is then also faced with the problem of separating the ester from the substantial amount of unreacted alcohol originally added to the reaction, and from the undesirably large amounts of polymeric material formed. The amount of polymeric material produced is frequently greater with the higher acrylate esters.

While improvement has been observed in the production of acrylate esters by the use of certain complex combinations of a nickel halide with certain phosphorus-sulfur compounds as catalysts, it has now been found that high conversion to acrylate esters can be achieved when the reaction is carried out in the presence of an inert N-alkyl pyrrolidone as the solvent medium. These catalyst complex combinations, which are hereinafter described in detail, are not the subject matter of this application, but are fully described and claimed in separate applications.

The catalyst complex combinations used are prepared by admixing a nickel halide, such as nickel bromide, nickel chloride, nickel fluoride and nickel iodide, with a phosphorus-sulfur-containing compound. Among the suitable phosphorus-sulfur-containing compounds are the organic phosphorus-sulfur-containing acids containing a pentavalent phosphorus atom having a thiono radical and a mercapto radical attached thereto, as represented by the formula:

and the nickel salts thereof; the organic phosphorus-sulfur compounds containing a pentavalent phosphorus atom having a thiono radical attached thereto and free of mercapto radical, as represented by the formula:

such as the organic phosphine sulfides or the organic thiophosphates; the organic trithiophosphites containing the trivalent phosphorus atom; the disulfides of the organic phosphorus-sulfur-containing acids containing a pentavalent phosphorus atom in what we call the bis-(phosphorthio) disulfide radical as represented by the general formula:

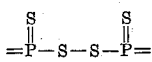

and the inorganic phosphorus sulfides and phosphorus selenides.

The organic phosphorus-sulfur-containing acids useful in preparing the catalyst complex of this invention contains the pentavalent phosphorus atom having a thiono radical and a mercapto radical attached thereto, as represented by the formula:

The suitable organic acids are the organic dithiophosphoric acid compounds, which can be represented by the general formula:

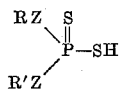

or the organic dithiophosphonic acid compounds, which can be represented by the general formula:

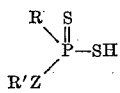

or the organic dithiophosphinic acid compounds, which can be represented by the general formula:

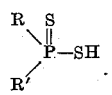

wherein R and R' when taken singly can represent an unsubstituted or substituted alkyl radical containing up to about 22 carbon atoms, or more, such as methyl, ethyl, propyl, chloroethyl, butyl, chloropropyl, methoxyethyl, methoxyethoxyethyl, 2-ethylhexyl, benzyl, phenethyl, and the like, an unsubstituted or substituted aryl radical such as phenyl, naphthyl, tolyl, xylyl, chlorophenyl, dichlorophenyl, nitrophenyl, nitrotolyl, and the like, a trihydrocarbylsilanyl radical, for example, a trialkyl- or triarylsilanyl radical such as triethylsilanyl or triphenylsilanyl, and the like; and Z represents an oxygen atom or an amido (—NR— or —NH—) radical; and when taken together RZ and R'Z can represent a cyclic dioxa nucleus or a substituted cyclic dioxa nucleus. By the term "cyclic dioxa nucleus" is meant a cyclic group as represented by the following formula:

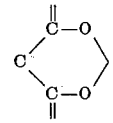

wherein the two oxygen atoms (Z) are connected to the phosphorus atom of the radical represented by:

and wherein the carbon atoms of the dioxa nucleus have their other valences satisfied by hydrogen atoms or other radicals. Hereinafter the terms "alkyl radicals" and "aryl radicals" will be used to represent both the unsubstituted and substituted radicals.

The nickel salts thereof can be represented by the general formula:

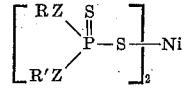

and the nickel salts of the organic dithiophosphonic acids, which can be represented by the general formula:

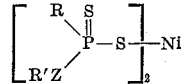

O-tolyl di-(ethylamido)-thiophosphate,
S,S'-diethyl ethylamidotrithiophosphate,
S,S'-dibutyl anilinotrithiophosphate,
S-ethyl di-(methylamido)dithiophosphate,
S-phenyl dianilinodithiophosphate,
O-ethyl S-ethyl ethylamidodithiophosphate,
and the like.

Suitable organic thiophosphates representative of the compounds depicted by Formula III are O,O'-diethyl ethanethiophosphonate, O,O' - diethyl benzenethiophosphonate, S,S'-diphenyl propanetrithiophosphonate, S,S'-dibutyl toluenetrithiophosphonate, S,S'-diethyl ethanetrithiophosphonate, O-ethyl S-phenyl propanedithiophosphonate, di-(ethylamido) ethanethiophosphonate, butylamido O-phenyl ethanethiophosphonate, S-ethyl P-ethylamido benzenedithiophosphonate, and the like.

Illustrative organic thiophosphates representative of the compounds depicted by Formula IV are ethylamido diethylthiophosphinate, ethylamido diphenylthiophosphinate, anilino dibutylthiophosphinate, O-ethyl dipropylthiophosphinate, O-cresyl dicresylthiophosphinate, S-ethyl diethyldithiophosphinate, S-ethyl diphenyldithiophosphinate, and the like.

The suitable organic trithiophosphites for preparing the catalyst complex useful in this invention can be represented by the following general formula:

wherein $R_1$, $R_2$ and $R_3$ represent an unsubstituted or substituted hydrocarbon radical, such as an alkyl radical containing up to about 22 carbon atoms or more, for example, methyl, ethyl, chloropropyl, propyl, tert.-butyl, methoxyethyl, 2-ethylhexyl, dodecyl, and the like, an unsubstituted or substituted aryl radical, for example, phenyl, naphthyl, chlorophenyl, nitrophenyl, and the like, an unsubstituted or substituted aralkyl radical, for example, benyl, chlorobenzyl, phenethyl, dimethylbenzyl, and the like, or an unsubstituted or substituted alkaryl radical, for example, tolyl, chlorotolyl, xylyl, and the like.

Illustrative of the organic trithiophosphites which are suitable for use in this invention there may be mentioned triethyl trithiophosphite, tributyl trithiophosphite, tri-(2-ethylhexyl)trithiophosphite, triphenyl trithiophosphite, tribenzyl trithiophosphite, tritolyl trithiophosphite, or S-methyl, S'-ethyl, S''-phenyl trithiophosphite, and the like.

The disulfides of the organic phosphorus-sulfur-containing acids which are used to prepare the catalyst complexes useful in this invention contain the pentavalent phosphorus atom, in what we call the bis-(phosphorthio) disulfide radical as represented by the general formula:

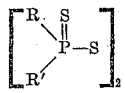

The suitable disulfides are the disulfides of the organic dithiophosphoric acid compounds, which can be represented by the general formula:

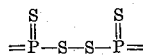

or the disulfides of the organic dithiophosphonic acid compounds, which can be represented by the general formula:

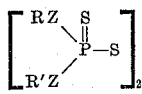

or the disulfides of the organic dithiophosphinic acid compound, which can be represented by the general formula:

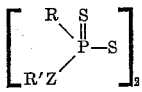

wherein R, R', Z, RZ and R'Z have the same meanings as hereinbefore described.

Illustrative of the disulfides of the organic dithiophosphoric acid compounds which are suitable for use in this invention there may be mentioned the disulfides of O,O'-dicresyldithiophosphoric acid,
O,O'-di-(2,4-dichlorophenyl)-dithiophosphoric acid,
O,O'-di-(4-nitrophenyl)-dithiophosphoric acid,
O,O'-diethyldithiophosphoric acid,
O,O'-di-(2-ethylhexyl)-dithiophosphoric acid,
O,O'-di-(2-methoxyethyl)-dithiophosphoric acid,
O,O' - [2 - (2 - methoxyethoxy)ethyl] - dithiophosphoric acid,
O,O'-di-(2-ethylbutyl)-dithiophosphoric acid,
O,O'-di-(triethylsilanyl)-dithiophosphoric acid,
O,O'-di-(triphenylsilanyl)-dithiophosphoric acid,
N,N'-dipropyldiamidodithiophosphoric acid,
N-methyl-N'-propyldiamidodithiophosphoric acid,
N,N'-diphenyldiamidodithiophosphoric acid,
5,5 - diethyl - 2 - mercapto - 2 - thiono - 1,3,2 - dioxa phosphorinane,
5 - ethyl - 2 - mercapto - 4 - propyl - 2 - thiono - 1,3,2- dioxaphosphorinane,
2,4 - dioxa - P - mercapto - 5 - methyl - P - thiono - 3- phosphobicyclo[4.4.0]decane,
and the like.

Among the disulfides of the organic dithiophosphonic acid compounds suitable for use in this invention are the disulfides of O-cresyl ethanedithiophosphonic acid, O-ethyl propanedithiophosphonic acid, O-phenyl benzenedithiophosphonic acid, O-(2-ethylhexyl) toluenedithiophosphonic acid, propylamidomethanedithiophosphonic acid, anilino benzenedithiophosphonic acid, tolylamido butanedithiophosphonic acid, and the like.

Illustrative disulfides of organic dithiophosphinic acid compounds suitable for use in this invention are the disulfides of diethyldithiophosphinic acid, diphenyldithiophosphinic acid, di-(chlorophenyl)-dithiophosphinic acid, ditolyldithiophosphinic acid, (phenyl)-ethyldithiophosphinic acid, (p-bromophenyl)-phenyldithiophosphinic acid, and the like.

The catalyst complex can be prepared by adding the phosphorus-sulfur compound to the alcohol reactant, or to the alcohol-solvent mixture, and then adding the nickel halide thereto, or the reverse order of addition can be used.

The inorganic phosphorus compounds which can be mixed with the nickel halides to produce the catalyst complex useful in this invention are the sulfides and the selenides such as tetraphosphorus trisulfide ($P_4S_3$), tetraphosphorus heptasulfide ($P_4S_7$), phosphorus trisulfide ($P_4S_6$), phosphorus disulfide ($P_3S_6$), phosphorus pentasulfide ($P_2S_5$), tetraphosphorus triselenide ($P_4Se_3$), phosphorus subselenide ($P_4Se$), phosphorus monoselenide ($P_2Se$), phosphorus triselenide ($P_2Se_3$), and phosphorus pentaselenide ($P_2Se_5$).

The acrylate esters are produced by reacting a mixture of an aliphatic saturated monohydroxy alcohol with acetylene and carbon monoxide in the presence of an N-alkyl pyrrolidone and a catalyst complex prepared from a nickel halide with a phosphorus-sulfur-containing compound at elevated temperature and under increased pressure. By means of this process, it has been possible to obtain conversions of ethanol to ethyl acrylate as high as about 95 percent based on the alcohol charged, with monomer to polymer ratios as high as about 8:1. Similarly, high yields have been observed when the improved process of this invention was applied to the production of higher acrylate esters. Among the aliphatic saturated monohydroxy alcohols which are suitably used are those containing from 1 to about 22 carbon atoms; with the alcohols containing from 1 to about 12 carbon atoms preferred. Illustrative alcohols are ethanol, the propanols, the butanols, pentanol, 2-ethylhexanol, dodecanol, 3-ethyl-2-pentanol, ethylene glycol monomethyl ether, ethylene glycol monoethyl ether, and the like.

The preferred inert solvents are the N-alkyl pyrrolidones containing from 1 to about 12 carbon atoms in the N-alkyl radical, which are liquid at ordinary room temperatures and from which the acrylate ester produced can be readily separated by distillation. In addition, N-alkyl pyrrolidones containing alkyl substituents on the carbon atoms of the pyrrolidone nucleus are also satisfactory solvents. Illustrative of suitable N-alkyl pyrrolidones are N-methyl-pyrrolidone, N-hexylpyrrolidone, 3-ethyl-N-ethylpyrrolidone, N-(2-ethylhexyl)pyrrolidone, and the like. By the term inert solvent is meant a solvent which will not react with the reactants, i.e., the alcohol, acetylene and carbon monoxide.

It has also been found that certain other inert solvents have a similar effect to the N-alkyl pyrrolidones in improving the acrylate synthesis. Among these there may be mentioned gamma-butyrolactone, tetrahydrofuran, and the N-acyl derivatives of morpholine, for example, N-acetylmorpholine and N-butyrylmorpholine, and N-acyl derivatives of the dialkylmorpholines, for example, 2,6 - dimethyl - N - acetylmorpholine. While the N-acyl morpholines can be used in this invention, they are not recommended because of their tendency to decompose under the reaction conditions. Tetrahydrofuran suffers the disadvantage of having a high vapor pressure at the reaction temperatures employed.

In addition to the much higher yields of monomeric acrylate ester obtained by the process of this invention, other of the distinct advantages are that the production of the higher acrylate esters is readily achieved, and that the lower acrylate esters can be readily distilled from the reaction mixture in pure form rather than as an azeotropic mixture with the unreacted alcohol, which then requires a separation of the azeotropic components. Also, by use of the high boiling N-alkyl pyrrolidones as solvents the total pressure of the reaction can be lowered by an amount equivalent to the decrease in the partial pressure of the alcohol at the reaction temperature.

The improved process of this invention is successfully carried out in the presence of the catalyst complex at temperatures of from about 90° C. to about 250° C., or higher. Temperatures of from about 100° C. to about 200° C. are preferred. The reaction can be expedited by the use of slight pressures; and we prefer to work at pressures exceeding about 100 p.s.i.g., with pressures of from about 150 p.s.i.g. to about 500 p.s.i.g. most preferred.

The mole ratio of nickel halide to phosphorus-sulfur containing compound can be varied over wide limits, and does not appear to be critical; nevertheless, we prefer to employ equimolar amounts of each component. The amount of catalyst complex charged to the reaction mixture is not critical, and can be varied over a wide range. When based on the alcohol charged, it has been found that a catalyst complex charge of from about 3% to about 8% is preferred. Higher concentrations of catalyst would give a faster reaction, but would require a greater expense in catalyst cost; while lower concentrations would be more economical as far as catalyst cost is concerned, but the production would suffer.

The reaction can be carried out in a batchwise or in a continuous manner by methods which are known to the art. The acetylene and carbon monoxide can be added separately, or for reasons of safety, as a mixture of gases, which mixture can be widely varied.

The amount of inert N-alkyl pyrrolidone added to the reaction mixture can be varied over a wide range; however, from a practical view it has been found that a range of from about 0.5 part to about 3 parts by weight of N-alkyl pyrrolidone per part by weight of alcohol charged to the reaction is satisfactory.

The acrylic acid ester produced can be recovered by simply distilling it from the reaction mixture when it has a boiling point lower than the N-alkyl pyrrolidone used. Alternatively, N-methylpyrrolidone can be used as a solvent and washed out of the final reaction mixture with water. The acrylate can then be distilled from the water-insoluble residue.

The following examples further serve to illustrate this invention. Parts are by weight unless otherwise stated.

Example 1

A three liter stainless steel autoclave was charged with 230 g. of anhydrous ethanol, 6.8 g. of nickel bromide, 9.5 g. of O,O'-dicresyldithiophosphoric acid and 450 ml. of N-methylpyrrolidone, sealed and purged several times with carbon monoxide. Then a 1:1 by volume mixture of acetylene and carbon monoxide was added to a gauge pressure of 40 p.s.i.g. After heating to 100° C., the pressure was increased 25 p.s.i.g. by adding acetylene, and then to 325 p.s.i.g. by the addition of the acetylene-carbon monoxide mixture. Heating was continued to 145° C., and the pressure was adjusted to 400 p.s.i.g. and maintained at 400 p.s.i.g. to 450 p.s.i.g. by the periodic addition of the 1:1 acetylene-carbon monoxide mixture for about 5.5 hours. During this period the temperature was maintained at from 145° C. to 170° C. The reaction was stopped by cooling the autoclave and then releasing the pressure. The reaction conditions produced a mixture of monomeric ethyl acrylate and higher molecular weight products at a conversion of about 93%, based on the ethanol charged and on the assumption that all of the higher molecular weight products are acrylates. These higher molecular weight products are polymeric acrylates and other by-products produced from the acetylene, alcohol and carbon monoxide during the reaction, and were not further identified. The reaction mixture was filtered to remove solid materials, and the filtrate was distilled. The ratio of monomeric ethyl acrylate to higher molecular weight products was about 7.5:1. The yield of monomeric ethyl acrylate recovered by distillation was 412 g.

In a manner as described above, but in the absence of any N-alkyl pyrrolidone, 925 g. of ethanol was treated with acetylene and carbon monoxide at about 135° C. over a 4.3 hour period in the presence of a complex combination of 23.6 g. of nickel iodide and 23.5 g. of O,O'-dicresyldithiophosphoric acid as catalyst. Even with the use of nickel iodide, which is the most reactive nickel halide in this catalyst complex combination, the conversion to monomeric ethyl acrylate and higher molecular weight products was only 20% based on the ethanol charged, and assuming that all of the higher molecular weight products are acrylates. The ratio of monomeric ethyl acrylate to higher molecular weight products was about 5:1. The yield of monomeric ethyl acrylate recovered by distillation was 338 g.

Example 2

In the manner described in Example 1, 391 g. of 2-ethylhexanol was treated with acetylene and carbon monoxide at 150° C. to 170° C. and under a maintained pressure of 250 p.s.i.g. to 300 p.s.i.g. over a 5.5 hour period in the presence of 500 ml. of N-methylpyrrolidine as solvent and a complex combination of 6.8 g. of nickel bromide and 9.5 g. of O,O'-discresyldithiophosphoric acid as catalyst. The conversion to 2-ethylhexyl acrylate and higher molecular weight products was 88% based on the weight of 2-ethylhexanol charged, and assuming that all of the higher molecular weight products are acrylates. The ratio of 2-ethylhexyl acrylate to higher molecular weight products was about 6.5:1. The yield of monomeric 2-ethylhexyl acrylate recovered by distillation was 425 g.

Example 3

In the manner described in Example 1, 391 g. of 2-ethylhexanol was treated with acetylene and carbon monoxide at 142° C. to 170° C. and under a maintained pressure of 125 p.s.i.g. to 175 p.s.i.g. over a 7.6 hour period in the presence of 517 g. of N-methylpyrrolidone as solvent and a complex combination of 6.8 g. of nickel bromide and 9.5 g. of O,O'-dicresyldithiophosphoric acid as catalyst. The conversion to 2-ethylhexyl acrylate and higher molecular weight products was 84% based on the weight of 2-ethylhexanol charged, and assuming that all of the higher molecular weight products are acrylates. The ratio of 2-ethylhexyl acrylate to higher molecular weight products was about 6:1. The 2-ethylhexyl acrylate was recovered from the reaction by washing the reaction mixture with water to remove N-methylpyrrolidone and then distilling the ester from the water insoluble fraction. The yield of monomeric 2-ethylhexyl acrylate recovered by distillation was 401 g.

Example 4

In the manner described in Example 1, 463 g. of N-butanol was treated with acetylene and carbon monoxide at 141° C. to 160° C. and under a maintained pressure of 250 p.s.i.g. to 300 p.s.i.g. over a 5.2 hour period in the presence of 570 g. of N-methylpyrrolidone as solvent and a complex combination of 16.5 g. of nickel bromide and 23.4 g. of O,O'-dicresyldithiophosphoric acid as catalyst. The conversion to n-butyl acrylate and higher molecular weight products was 89% based on the weight of n-butanol charged, and assuming that all of the higher molecular weight products are acrylates. The ratio of n-butyl acrylate to higher molecular weight products was 7:1. The yield of monomeric n-butyl acrylate recovered by distillation was 625 g.

Example 5

In the manner described in Example 1, 230 g. of ethanol was treated with acetylene and carbon monoxide at 145° C. to 170° C. and under a maintained pressure of 400 p.s.i.g. to 450 p.s.i.g. over a 6 hour period in the presence of 418 parts of N-hexylpyrrolidone as solvent and a complex combination of 6.8 g. of nickel bromide and 9.5 g. of O,O'-dicresyldithiophosphoric acid as catalyst. The conversion of ethyl acrylate and higher molecular weight products was about 81% based on the weight of alcohol charged, and assuming that all of the higher molecular weight products are acrylates. The ratio of ethyl acrylate to higher molecular weight products was about 8:1. The yield of monomeric ethyl acrylate removered by distillation was 359 g.

Example 6

In the manner described in Example 1, 391 g. of 2-ethylhexanol was treated with acetylene and carbon monoxide at 150° C. to 170° C. and under a maintained pressure of 250 p.s.i.g. to 300 p.s.i.g. over a 4.5 hour period in the presence of 475 ml. of N-hexyl-2-pyrrolidone as solvent and a complex combination of 6.8 g. of nickel bromide and 9.5 g. of O,O'-dicresyldithiophosphoric acid as catalyst. The conversion to 2-ethylhexyl acrylate and higher molecular weight products was 85% based on the weight of 2-ethylhexanol charged, and assuming that all of the higher molecular weight products are acrylates. The ratio of 2-ethylhexyl acrylate to higher molecular weight products was 7:1. The yield of monomeric 2-ethylhexyl acrylate recovered by distillation was 408 g.

Example 7

In the manner described in Example 1, 391 g. of 2-ethylhexanol was treated with acetylene and carbon monoxide at 149 to 170° C. and under a maintained pressure of 250–300 p.s.i.g. over a 5.7 hour period in the presence of 460 g. of N(2-ethylhexyl)pyrrolidone as solvent and a complex combination of 6.8 g. of nickel bromide and 9.5 g. of O,O'-dicresyldithiophosphoric acid as catalyst. The monomeric 2-ethylhexyl acrylate was distilled from the reaction mixture. The conversion to 2-ethylhexyl acrylate and higher molecular weight products was 95 percent based on the weight of alcohol charged, and assuming that all of the higher molecular weight products are acrylates. The ratio of 2-ethylhexyl acrylate to higher molecular weight products was 7:1. The yield of monomeric 2-ethylhexyl acrylate recovered by distillation was 462 g.

The catalyst complexes employed in this invention give higher conversions to monomeric acrylate esters at temperatures about 20° C. lower than required when a nickel halide alone is used in the presence of an N-alkylpyrrolidone as seen from the monomer/polymer ratios in the following data:

| Example | 8 | 9 |
|---|---|---|
| Nickel bromide, g | 6.8 | 6.8 |
| O,O'-Di-(2-ethylhexyl) dithiophosphoric acid, g | | 12.0 |
| N-Methylpyrrolidone, ml | 500 | 500 |
| n-Butanol, g | 428 | 428 |
| Conditions: | | |
| Pressure, p.s.i.g | 325–375 | 325–375 |
| Time, hours | 5 | 4.6 |
| Temperature, °C | 163–179 | 145–162 |
| Product: | | |
| Monomer, g | 436 | 467 |
| Polymer, g | 48 | 41 |
| Monomer/polymer ratio | 9.1 | 11.5:1 |

The importance of the presence of the phosphorus-sulfur compound in the catalyst complex is further brought out in the data below. A comparison of Example 10 with Example 11 clearly indicates that the presence of a phosphorus-sulfur compound in the catalyst complex vastly improves conversion to an extent not expected, even when the temperature is maintained from 15° to 30° C. lower. A comparison of Example 10 with Example 12, in which the reaction conditions of time and temperature were kept constant, shows that in the absence of the phosphorus-sulfur compound the nickel bromide/N-methylpyrrolidone catalyst is practically ineffective at 170° C., whereas with the phosphorus-sulfur compound high conversion to monomer is obtained. The results obtained are new and would not be expected in view of the known art.

| Example | 10 | 11 | 12 |
|---|---|---|---|
| Nickel bromide/N-methylpyrrolidone, g | 16.1 | 16.1 | 16.1 |
| O,O'-Di-(2-ethylhexyl)dithiophosphoric acid, g | 12 | | |
| n-Butanol | 428 | 428 | 428 |
| Conditions: | | | |
| Pressure, p.s.i.g | 350–400 | 375–425 | 375–425 |
| Temperature, °C | 153–170 | 185 | 170 |
| Time, hours | 4.5 | 4.5 | 4.5 |
| Total pressure decrease, p.s.i | 1,225 | 510 | 135 |
| Product: | | | |
| Monomer, g | 338 | 129 | 20 |
| Polymer, g | 59 | ca. 25 | ca. 5 |
| Monomer/polymer ratio | 5.7:1 | 5:1 | 4:1 |
| Yield to monomer, percent | 46 | 17.3 | 2.7 |

These higher yields of monomer over polymer are a distinct and desirable advantage from an economic and financial point of view when it is remembered that annual production of acrylate esters by the reaction of acetylene carbon monoxide and an alcohol is expected to total several hundred million pounds.

What is claimed is:

1. In a process for the production of esters of acrylic acid by the interaction of a saturated monohydric aliphatic alcohol with acetylene and carbon monoxide in the presence of a catalyst complex of a nickel halide and an organic phosphorus-sulfur-containing acid containing a pentavalent phosphorus atom having a thiono radical, attached to said phosphorus atom as represented by the general formula:

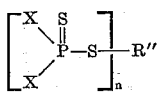

wherein R″ represents a member selected from the group consisting of a hydrogen atom and a nickel atom; $n$ is an integer having a value of 1 and 2; and X represents a member selected from the group consisting of R, R′, RZ, and R′Z radicals in which R and R′ singly are members selected from the group consisting of alkyl radicals containing up to about 22 carbon atoms, aryl radicals selected from the group consisting of a phenyl radical and a naphthyl radical, and trihydrocarbylsilanyl radicals; Z represents a member selected from the group consisting of an oxygen atom and an amido radical; and when taken together RZ and R′Z represent a cyclic dioxa nucleus; the improvement which consists of using N-hexylpyrrolidone as the inert solvent medium in said process.

2. In a process for the production of esters of acrylic acid by the interaction of a saturated monohydric aliphatic alcohol with acetylene and carbon monoxide in the presence of a catalyst complex of a nickel halide and an organic phosphorus-sulfur-containing acid containing a pentavalent phosphorus atom having a thiono radical, attached to said phosphorus atom as represented by the general formula:

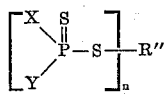

wherein R″ represents a member selected from the group consisting of a hydrogen atom and a nickel atom; $n$ is an integer having a value of 1 and 2; and X represents a member selected from the group consisting of R, R′, RZ, and R′Z radicals in which R and R′ singly are members selected from the group consisting of alkyl radicals containing up to about 22 carbon atoms, aryl radicals selected from the group consisting of a phenyl radical and a naphthyl radical, and trihydrocarbylsilanyl radicals; Z represents a member selected from the group consisting of an oxygen atom and an amido radical; and when taken together RZ and R′Z represent a cyclic dioxa nucleus; the improvement which consists of using N-(2-ethylhexyl) pyrrolidone as the inert solvent medium in said process.

References Cited by the Examiner

UNITED STATES PATENTS

| 2,806,040 | 9/1957 | Reppe et al. | 260—486 |
| 2,809,976 | 10/1957 | Reppe et al. | 260—486 X |
| 2,845,451 | 7/1958 | Lautenschlager et al. | 260—486 |

FOREIGN PATENTS

| 805,641 | 5/1951 | Germany. |
| 944,789 | 6/1956 | Germany. |

LORRAINE A. WEINBERGER, *Primary Examiner.*

CHARLES B. PARKER, A. H. WINKELSTEIN,
*Examiners.*

E. C. SPAETH, L. M. SHAPIRO, A. P. HALLUIN,
*Assistant Examiners.*